US011217852B2

(12) United States Patent
Matsumoto

(10) Patent No.: US 11,217,852 B2
(45) Date of Patent: Jan. 4, 2022

(54) BATTERY PACK

(71) Applicant: HONDA MOTOR CO., LTD., Tokyo (JP)

(72) Inventor: Takashi Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/648,899

(22) PCT Filed: Sep. 3, 2018

(86) PCT No.: PCT/JP2018/032544
§ 371 (c)(1),
(2) Date: Mar. 19, 2020

(87) PCT Pub. No.: WO2019/065094
PCT Pub. Date: Apr. 4, 2019

(65) Prior Publication Data
US 2020/0287183 A1    Sep. 10, 2020

(30) Foreign Application Priority Data

Sep. 29, 2017 (JP) .............................. JP2017-190003

(51) Int. Cl.
*H01M 50/20* (2021.01)
*H01M 50/10* (2021.01)

(52) U.S. Cl.
CPC .......... *H01M 50/20* (2021.01); *H01M 50/10* (2021.01); *H01M 2220/20* (2013.01)

(58) Field of Classification Search
CPC ............. H01M 2/1077; H01M 2/024; H01M 2220/20; H01M 2/10; Y02E 60/10
See application file for complete search history.

(56) References Cited

U.S. PATENT DOCUMENTS

2005/0202315 A1* 9/2005 Sugeno ............... H01M 2/0242
429/156
2014/0226292 A1    8/2014 Mochizuki et al.
(Continued)

FOREIGN PATENT DOCUMENTS

JP    2014-179965    9/2014
JP    2016-177935    10/2016
(Continued)

OTHER PUBLICATIONS

International Search Report and Written Opinion for International Application No. PCT/JP2018/032544 dated Nov. 20, 2018, 7 pages.
(Continued)

*Primary Examiner* — Ula C Ruddock
*Assistant Examiner* — Sarika Gupta
(74) *Attorney, Agent, or Firm* — Amin, Turocy & Watson, LLP

(57) ABSTRACT

A battery pack comprises a battery core pack that has a plurality of battery cells held in a cell holder, and a case that accommodates the battery core pack. The case has an outer shell case that covers the side surface of the battery core pack, and a bottom case that covers the bottom surface of the battery core pack. A lower-side battery core pack frame that supports the battery core pack is secured in a lower-side securing groove provided to an inner wall of the outer shell case. The lower-side securing groove is disposed above the upper-end part of the bottom case attached to the lower-end part of the outer shell case.

5 Claims, 5 Drawing Sheets

(56) References Cited

U.S. PATENT DOCUMENTS

| | | |
|---|---|---|
| 2015/0064514 A1 | 3/2015 | Wu et al. |
| 2018/0108959 A1 | 4/2018 | Kuboki et al. |
| 2019/0044111 A1 | 2/2019 | Morita et al. |
| 2020/0067033 A1 | 2/2020 | Sumida |

FOREIGN PATENT DOCUMENTS

| | | |
|---|---|---|
| JP | 2016-534518 | 11/2016 |
| JP | 2017-107876 | 6/2017 |
| JP | 2017-182914 | 10/2017 |
| WO | 2017/135232 | 8/2017 |
| WO | 2018/155182 | 8/2018 |

OTHER PUBLICATIONS

Taiwanese Office Action for Taiwanese Patent Application No. 107131891 dated May 10, 2019.

\* cited by examiner

BATTERY PACK

TECHNICAL FIELD

The present invention relates to a battery pack that includes a battery core pack including a plurality of battery cells held in a cell holder, and a case accommodating the battery core pack.

BACKGROUND ART

As described in Japanese Laid-Open Patent Publication No. 2016-534518 (PCT), for example, battery packs that have a battery core pack including a plurality of battery cells held in a cell holder, and a case accommodating the battery core pack, are known as battery packs that can be removably mounted in electric vehicles such as electric power-assisted bicycles, electric motorcycles, and the like.

The case includes an exterior case that covers the side surfaces of the battery core pack, and a bottom case mounted on the lower end of the exterior case to cover the bottom surface of the battery core pack.

SUMMARY OF INVENTION

If a battery pack of this type falls while being attached to or removed from an electric vehicle etc., for example, then the battery pack may hit the ground at a corner of the bottom case and undergo an impact load. If the bottom case comes off the exterior case, or if it is broken, due to the impact load, then the battery core pack cannot be held in the case and may be exposed from the case. That is, it becomes difficult to sufficiently protect the battery core pack.

A main object of the present invention is to provide a battery pack in which the battery core pack can be supported in the case in a desirable manner.

An aspect of the present invention provides a battery pack including a battery core pack having a plurality of battery cells held in a cell holder, and a case accommodating the battery core pack, wherein the case includes an exterior case configured to cover side surfaces of the battery core pack and a bottom case configured to cover a bottom surface of the battery core pack, a battery core pack frame configured to support the battery core pack is fixed to a fixing portion provided at an inner wall of the exterior case, and the fixing portion is disposed at a position above an upper end portion of the bottom case that is attached to a lower end portion of the exterior case.

In the battery pack, the battery core pack frame is fixed to the fixing portion provided at inner walls of the exterior case. Consequently, even if the bottom case comes off the exterior case or is broken due to an impact load as mentioned above, the battery core pack frame can keep supporting the battery core pack inside the exterior case.

Furthermore, the fixing portion is disposed at a position above the upper end portion of the bottom case mounted on a lower end portion of the exterior case, and thus it is possible to prevent the impact load from being transmitted to the fixing portion through the bottom case. This prevents the battery core pack frame from coming off the exterior case, and thus it is also possible to keep supporting the battery core pack inside the exterior case in a desirable manner.

As described above, with the battery pack, the battery core pack can be supported inside the case suitably and protected from the above-mentioned impact load.

The above and other objects, features, and advantages of the present invention will become more apparent from the following description when taken in conjunction with the accompanying drawings, in which a preferred embodiment of the present invention is shown by way of illustrative example.

DESCRIPTION OF EMBODIMENTS

The battery pack according to the present invention will be described in detail referring to the accompanying drawings in conjunction with preferred embodiments.

Figure 1:
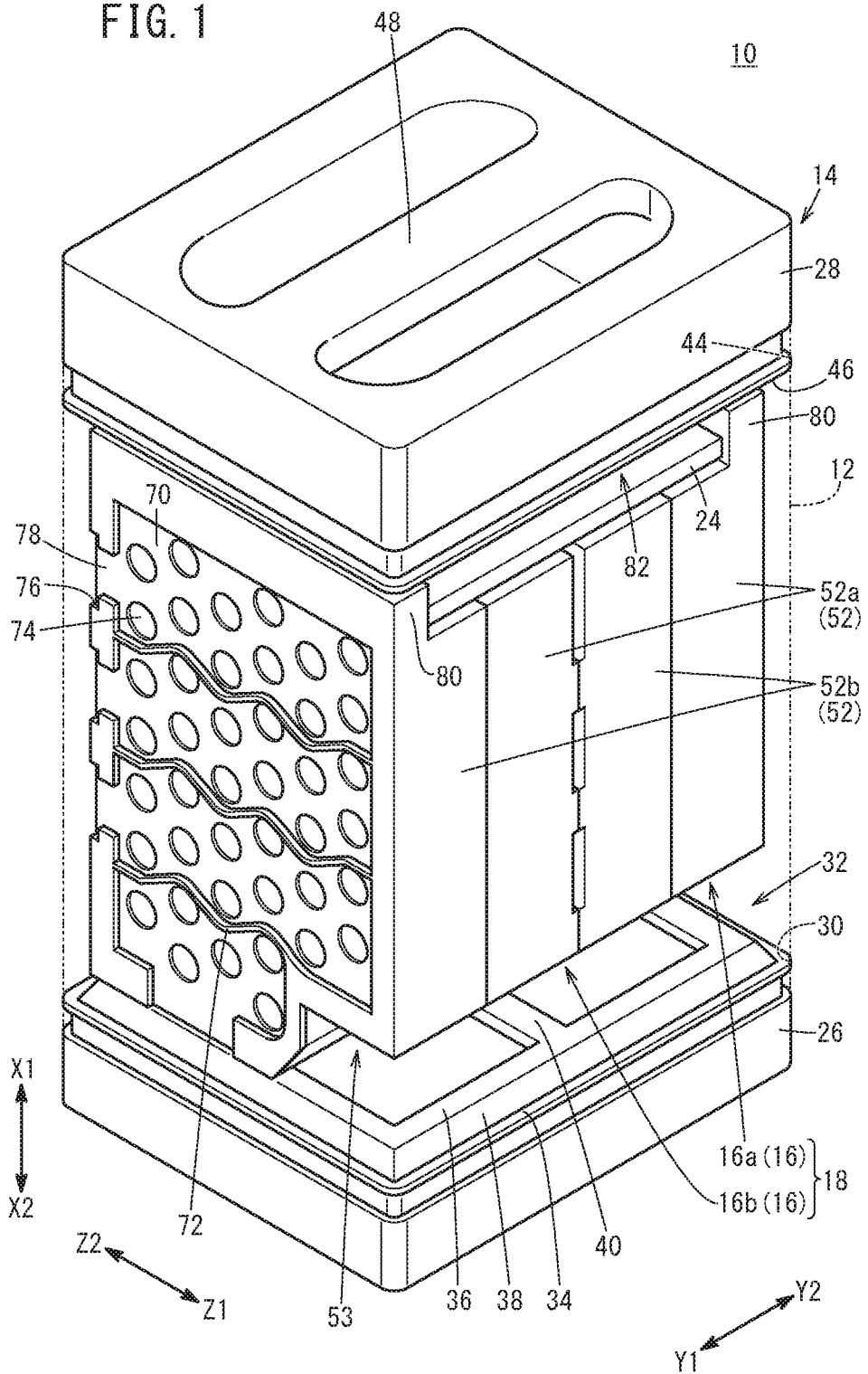
FIG. 1 is a schematic perspective view of a battery pack according to an embodiment of the present invention.

FIG. 1 is a schematic perspective view of a battery pack 10 according to this embodiment. In order to facilitate understanding, FIG. 1 shows an exterior case 12 with two-dot chain line so that the constituent components provided inside the exterior case 12 can be seen.

The battery pack 10 can be suitably applied as a portable battery pack 10 that is removably mounted in an electric vehicle (not shown) such as an electric power-assisted bicycle, electric motorcycle, etc. Accordingly, an example in which the battery pack 10 is mounted in an electric vehicle will be described below, but application thereof is not particularly limited thereto. The battery pack 10 can be applied to various devices that require electric power. Note that the top-bottom direction of the battery pack 10 will be defined as the vertical direction that is defined when the battery pack 10 is mounted in an electric vehicle (arrow X1, X2 direction in FIG. 1).

As shown in FIG. 1, basically, the battery pack 10 includes a case 14, a connected body 18 including two battery core packs 16*a*, 16*b* connected to each other, a battery management unit (BMU) 24, and a connector unit not shown. The case 14 can be made of metal such as aluminum, or resin (including fiber-reinforced resin), etc. The case 14 includes a bottom case 26 that covers the bottom surface of the connected body 18, the exterior case 12 that is mounted on the upper end of the bottom case 26 to cover the side surfaces of the connected body 18, and a top case 28 that is mounted on the upper end of the exterior case 12 to cover the upper surface of the connected body 18.

The bottom case 26 is a casing that has an opening formed at its upper end, which accommodates the connector unit and the like. The connector unit is exposed out of the case 14 through, for example, a cutout etc. formed in the bottom wall of the bottom case 26, so as to be connected to a power supply port of an electric vehicle, or to a charging device for charging the connected body 18. None of the cutout, the power supply port, and the charging device are shown. The power supply port or charging device and the connected body 18 can be connected electrically via the BMU 24 through a lead wire etc. (not shown), by connecting the connector unit to the power supply port or charging device.

The exterior case 12 has openings formed at both its ends in the vertical direction. Part of the upper end of the bottom case 26 is inserted into the opening at the lower end of the exterior case 12. The exterior case 12 has a lower-side fixing groove 30 (fixing portion) that is formed in inner walls thereof along its peripheral direction, at a position above the upper end of the bottom case 26 inserted into the exterior case 12. A lower-side battery core pack frame 32 is fixed in the lower-side fixing groove 30 and supports the connected body 18 from under.

Figure 2:
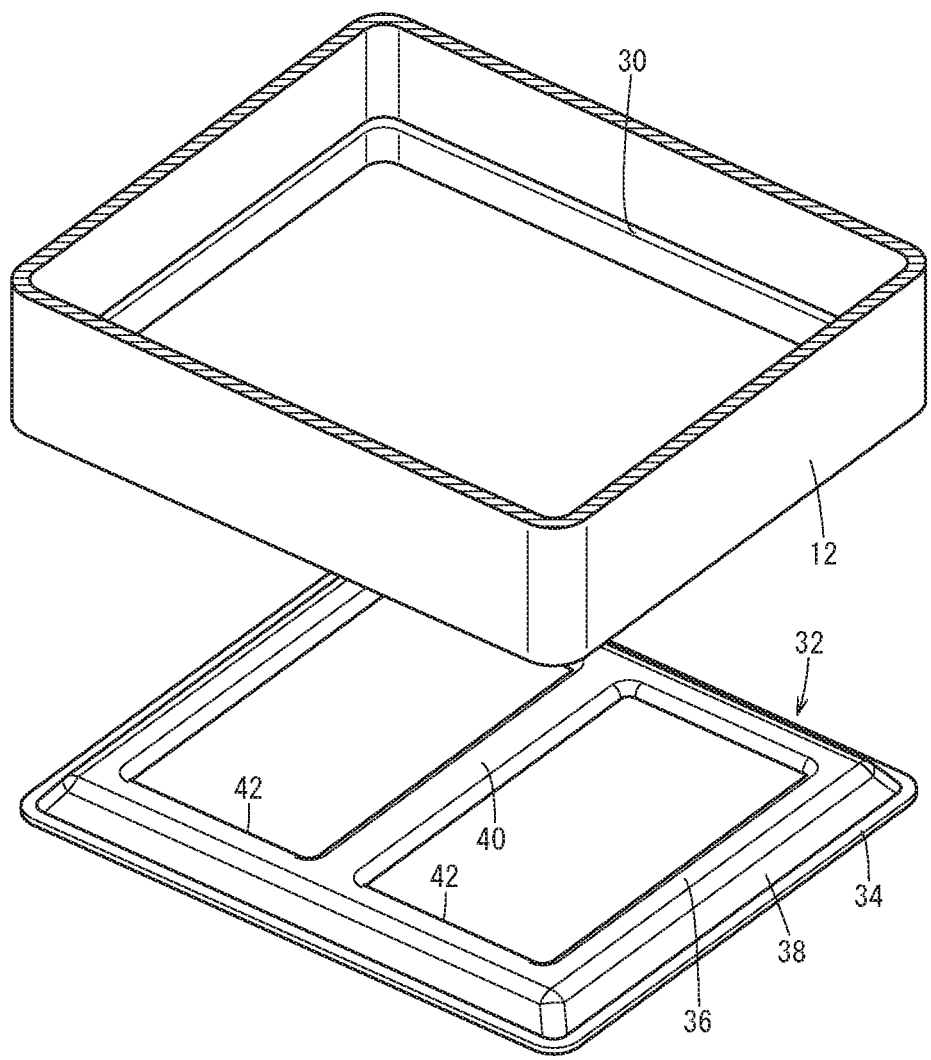
FIG. 2 is an exploded perspective view of a lower end portion of an exterior case and a lower-side battery core pack frame.
Figure 3:
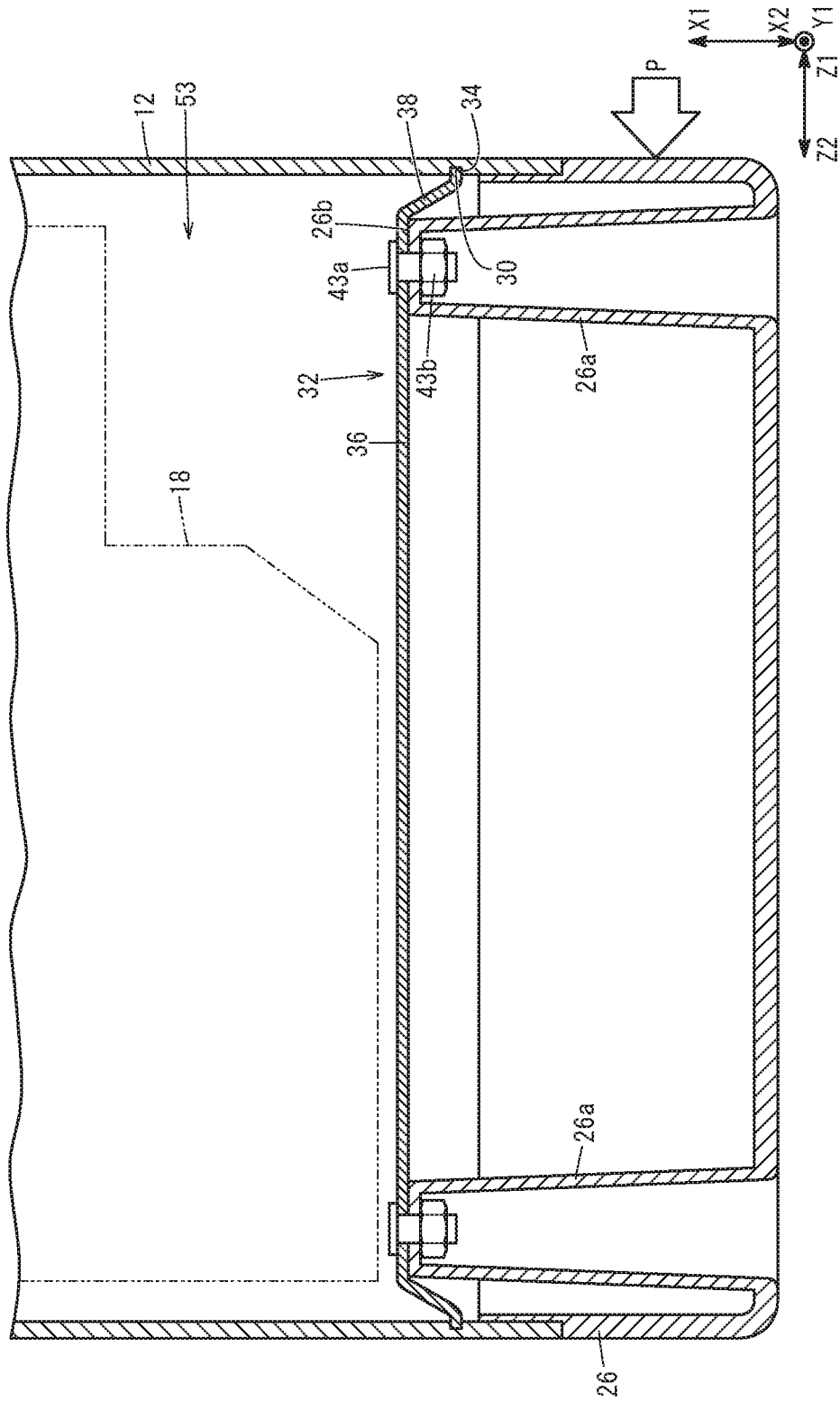
FIG. 3 is a cross-sectional view showing a main part that illustrates a positional relationship between a lower-side fixing groove and a bottom.

More specifically, as shown in FIGS. 2 and 3, the lower-side battery core pack frame 32 includes a flange portion 34, an abutting portion 36, and a connecting portion 38. The flange portion 34 extends outward in a horizontal direction from the outer peripheral edge of the lower end of the connecting portion 38, so as to be inserted in the lower-side fixing groove 30. The abutting portion 36 is formed into a frame plate shape on which part of the lower end surface of the connected body 18 abuts. The abutting portion 36 includes a reinforcing portion 40 extending through substantially the middle in the horizontal direction, and opening portions 42 formed on both sides in the direction orthogonal to the direction in which the reinforcing portion 40 extends. As shown in FIG. 3, the outer periphery of the abutting portion 36 is spaced apart from the inner surfaces of the exterior case 12.

The connecting portion 38 is formed into a plate shape that has its lower end connected to the flange portion 34 and its upper end connected to the abutting portion 36, and is inclined such that the distance from the inner surfaces of the exterior case 12 becomes larger in a direction from the flange portion 34 side (lower side) to the abutting portion 36 side (upper side).

As shown in FIGS. 2 and 3, for example, the lower-side battery core pack frame 32 is put into the exterior case 12 from the abutting portion 36 side, through the opening at the lower end of the exterior case 12. Then, the flange portion 34 is inserted into the lower-side fixing groove 30 to thereby fix the lower-side battery core pack frame 32 in the lower-side fixing groove 30. In this process, the flange portion 34 can be easily inserted in the lower-side fixing groove 30 when each corner of the lower-side battery core pack frame 32 and the exterior case 12 is rounded, with the radius of curvature of the corners of the lower-side battery core pack frame 32 being larger than the radius of curvature of the corners of the exterior case 12.

As shown in FIG. 3, the bottom surface of the bottom case 26 has raised portions 26a formed thereon, which project toward the abutting portion 36 of the lower-side battery core pack frame 32, and the projecting end faces 26b of the raised portions 26a and the abutting portion 36 are fixed by bolts 43a and nuts 43b.

As shown in FIG. 1, part of the lower end of the top case 28 is inserted in the opening at the upper end of the exterior case 12. An upper-side fixing groove 44 is formed in the inner walls of the exterior case 12 at a position below the lower end of the top case 28 inserted into the exterior case 12. An upper-side battery core pack frame 46 is fixed in the upper-side fixing groove 44 and abuts on the upper end surface of the connected body 18.

The upper-side battery core pack frame 46 is configured in substantially the same manner as the lower-side battery core pack frame 32, and is fixed in the upper-side fixing groove 44 in an attitude vertically inverse to that of the lower-side battery core pack frame 32. Accordingly, the upper-side battery core pack frame 46 will not be described in detail again.

The connected body 18 is thus held between the upper-side battery core pack frame 46 and the lower-side battery core pack frame 32 that are fixed to the exterior case 12 in this manner.

The top case 28 is a casing that has an opening formed at its lower end, and the top case 28 further has a handle portion 48 formed at its upper end surface, by which the battery pack 10 can be carried. Like the bottom case 26 and the lower-side battery core pack frame 32, the top case 28 and the upper-side battery core pack frame 46 are also fixed together by bolts etc. (not shown).

The two battery core packs 16a, 16b that constitute the connected body 18 are configured in substantially the same manner. Hence, the corresponding constituent components of the two battery core packs 16a, 16b are labeled using the same reference numerals and will be described in common. Also, the two battery core packs 16a, 16b will be generically referred to as battery core pack 16 when it is not necessary to distinguish them from each other.

Each battery core pack 16 includes a plurality of battery cells 50 (see FIG. 4) and a cell holder 52. As shown in FIG. 1, in this embodiment, the battery core packs 16 have a cutout portion formed in part of their lower end, in order to form a space 53 for accommodating wiring etc. (not shown) between the battery core packs 16 and the connector unit.

Figure 4:
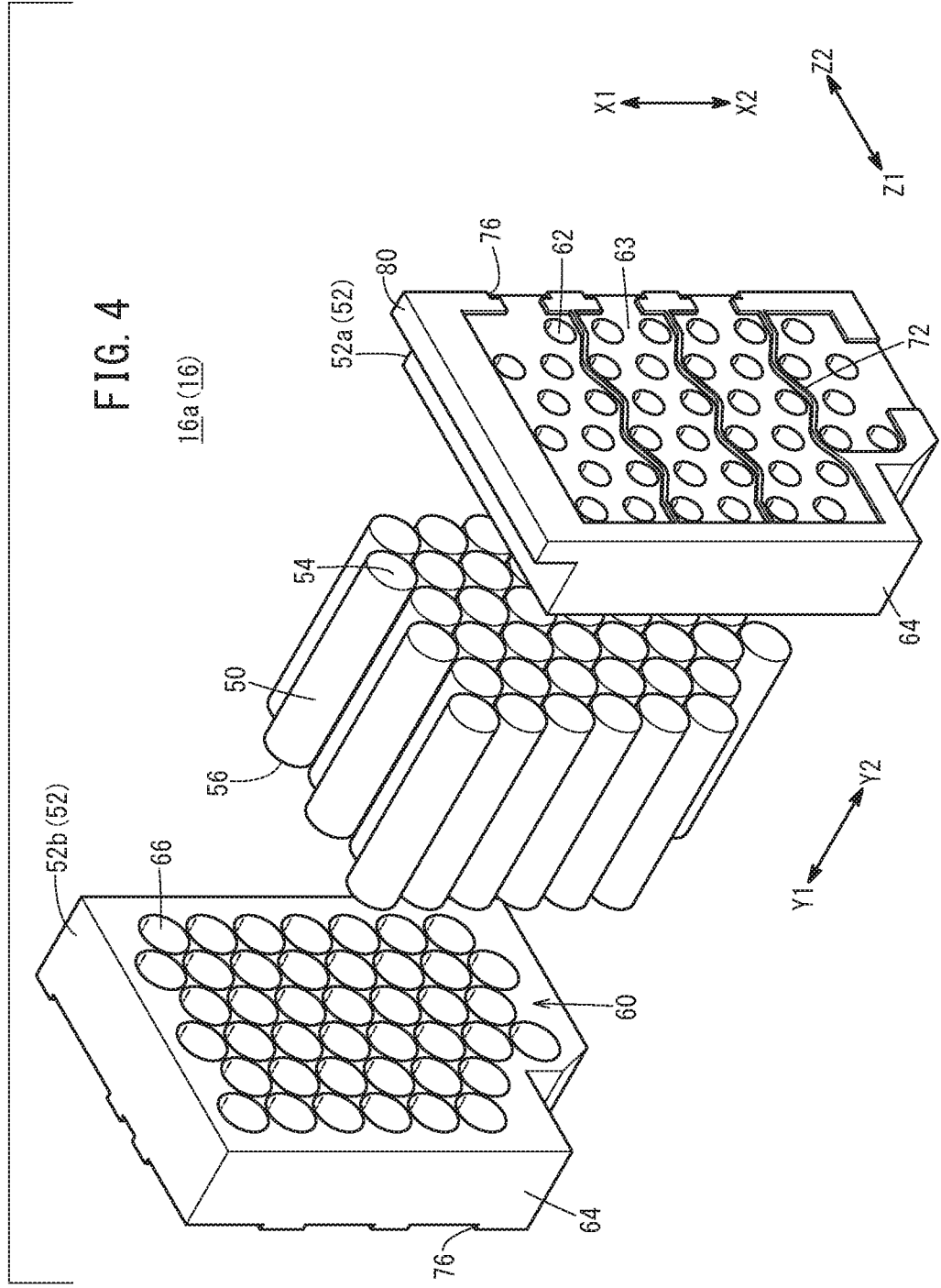
FIG. 4 is an exploded perspective view of a battery core pack.

As shown in FIG. 4, each battery cell 50 has a cylindrical shape, for example, with a positive terminal 54 and a negative terminal 56 formed respectively at both ends thereof in the axial direction. Battery cells 50 of preferred types include lithium-ion secondary batteries, but the battery cells 50 are not particularly limited to this type, and they can be secondary batteries such as nickel-metal hydride batteries, nickel-cadmium batteries, etc., for example.

The cell holder 52 is made of a combination of a positive-side holder 52a and a negative-side holder 52b, each including a holding portion 60 for holding the plurality of battery cells 50, a press plate portion 63 having exposure portions 62 formed therein, and a peripheral wall portion 64 that surrounds the holding portion 60 and the exposure portions 62. The positive terminals 54 are exposed from the exposure portions 62 of the positive-side holder 52a, and the negative terminals 56 are exposed from the exposure portions 62 of the negative-side holder 52b.

In the description below, the cell holder 52 will be explained based on the vertical direction mentioned above (hereinafter also referred to as X direction), the axial direction of the battery cells 50 (the arrow Y1, Y2 directions in FIG. 1, which will hereinafter be referred to also as Y direction), and a direction perpendicular to both the vertical and axial directions (the arrow Z1, Z2 directions in FIG. 1, which will hereinafter be referred to also as Z direction).

The holding portions 60 have a plurality of insertion holes 66 formed therein, so as to hold the battery cells 50 inserted respectively in the insertion holes 66. Each insertion hole 66 extends in the Y direction and exposes the positive terminal 54 and negative terminal 56 of the battery cell 50 respectively from the openings at both ends in the direction in which it extends. Each insertion hole 66 has a diameter corresponding to the outer diameter of the battery cell 50. The plurality of battery cells 50 held in the holding portions 60 are positioned such that their respective positive terminals 54 are flush together and their respective negative terminals 56 are flush together. The gaps between the circumferential surfaces of the plurality of battery cells 50 held in the holding portion 60 may be filled with potting material (not shown), such as insulating resin, etc.

The press plate portions 63 are provided respectively at both ends in the Y direction of the holding portions 60, which have through holes serving as the exposure portions 62 that are formed in positions corresponding to the openings of the insertion holes 66. The positive terminals 54 and the negative terminals 56 (hereinafter also referred to generically as electrode terminals) are exposed out of the cell holder 52 through the openings of the insertion holes 66 and the exposure portions 62. A plurality of busbar plates 70 (see FIG. 1) are attached to the press plate portions 63, so as to cover the exposure portions 62 for exposing the positive terminals 54 and the exposure portions 62 for exposing the negative terminals 56. Each press plate portion 63 has elongated protrusions 72 interposed between the busbar plates 70 to insulate them from each other.

The two battery core packs 16a, 16b are coupled to each other to form the connected body 18 in such a manner that the negative terminal 56 side of one battery core pack 16a and the positive terminal 54 side of the other battery core pack 16b face each other.

The positive terminal 54 side of that one battery core pack 16a and the negative terminal 56 side of that other battery core pack 16b, in other words, the side surfaces of the connected body 18 on both sides in the Y direction, face the inner sides of the exterior case 12.

The plurality of busbar plates 70 are each provided to connect a given number of positive terminals 54 or negative terminals 56 in parallel. Each busbar plate 70 has protrusions 74, formed by embossing, for example, that enter the exposure portions 62 so as to be in contact with the electrode terminals. Each busbar plate 70 has a connection end 78 that is inserted into a groove 76 formed in the end surface of the peripheral wall portion 64. The connection end 78 and the lead wire etc., mentioned earlier, are connected to each other, so that the plurality of busbar plates 70 are connected to the connector unit through the BMU 24, with the busbar plates 70 connected in series.

It is preferable to interpose a heat dissipation sheet (not shown) between the busbar plates 70 and the inner surfaces of the exterior case 12. In this case, the heat generated by the battery cells 50 can be effectively dissipated through the heat dissipation sheet so as to suppress temperature rise of the connected body 18.

Protruding walls 80, which protrude upward, are provided on one side in the Y direction (on the arrow Y2 side in FIG. 1), at the upper end of the positive-side holder 52a of the battery core pack 16a, and on the other side in the Y direction (on the arrow Y1 side in FIG. 1), at the upper end of the negative-side holder 52b of the battery core pack 16b, respectively. The upper-side battery core pack frame 46 abuts on the upper end surfaces of the protruding walls 80. This configuration forms a space 82 between the connected body 18 and the upper-side battery core pack frame 46, and the BMU 24 is placed in the space 82 (see FIG. 1).

For example, the BMU 24 includes a control unit configured to control charging and discharging of the battery core packs 16, a communication unit configured to perform communications with the electric vehicle and charging device, and a storage unit for storing the state of the battery core pack 16 detected based on temperature, voltage, etc. of the battery cells 50 (none of which are shown).

The battery pack 10 of this embodiment is configured basically as explained so far. With this battery pack 10, the battery pack 10 can be carried to the vicinity of a charging device by being held at the handle portion 48, so as to connect the connector unit and the charging device to charge the battery cells 50, for example. Also, for example, the battery pack 10 can be carried by being held at the handle portion 48 and mounted in an electric vehicle, so as to connect the connector unit and the power supply port to thereby discharge the battery cells 50.

Figure 5:
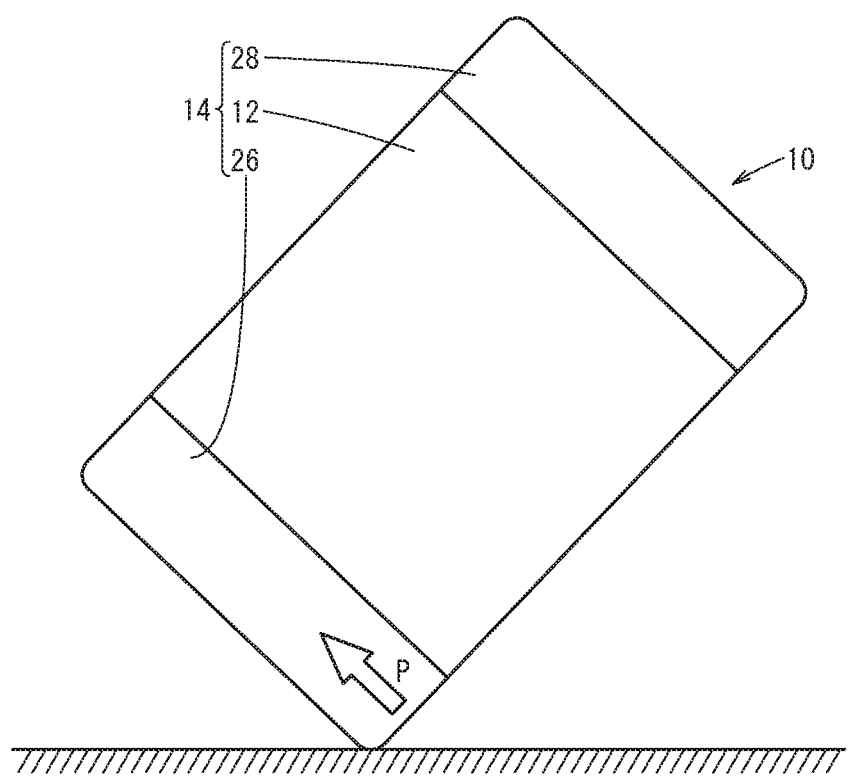
FIG. 5 is a schematic diagram for explaining an impact load that is applied to the battery pack when the battery pack falls and a corner of the bottom case hits the ground.

It is expected that, as described earlier, the battery pack 10 is carried with the bottom case 26 side disposed downward in the vertical direction, while being held at the handle portion 48 on the top case 28. Accordingly, as shown in FIG. 5, for example, there are cases where the battery pack may fall while being attached to or removed from an electric vehicle etc. and then a corner of the bottom case 26 may hit the ground and undergoes an impact load. In this case, a component force of the impact load occurs in a direction orthogonal to the direction in which the upper end of the bottom case 26 is inserted into the opening at the lower end of the exterior case 12 (in the arrow P direction in FIGS. 3 and 5). As a result, the bottom case 26 is likely to come off the exterior case 12 or to be broken. The lower-side battery core pack frame 32 also might come off the exterior case 12 or be broken.

In the battery pack 10 of this embodiment, as described above, the lower-side battery core pack frame 32 supporting the connected body 18 is fixed to the lower-side fixing groove 30 formed in the inner walls of the exterior case 12. Consequently, even if the bottom case 26 comes off the exterior case 12 or is broken due to the above-mentioned impact load, the lower-side battery core pack frame 32 keeps supporting the connected body 18 inside the exterior case 12.

Furthermore, the lower-side fixing groove 30 is disposed at a position above the upper end of the bottom case 26 mounted on the lower end of the exterior case 12, and thus it is possible to prevent the above-mentioned impact load from being transmitted through the bottom case 26 to the flange portion 34 inserted into the lower-side fixing groove 30. This prevents the lower-side battery core pack frame 32 from coming off the exterior case 12 or from being broken. This also makes it possible to keep supporting the connected body 18 inside the exterior case 12 suitably.

In this way, with the battery pack 10, it is possible to support the connected body 18 in the case 14 (exterior case 12) suitably and to protect the connected body 18 from the impact load mentioned above.

In this embodiment, the top case 28 and the upper-side battery core pack frame 46 are also configured in the same manner as the bottom case 26 and the lower-side battery core pack frame 32, and thus provide the same functions and effects. That is, even if the battery pack 10 falls and a corner of the top case 28 hits the ground and undergoes an impact load, it is possible to prevent the upper-side battery core pack frame 46 from coming off the exterior case 12 and to keep the connected body 18 supported in the exterior case 12 in a desirable manner.

The present invention is not particularly limited to the above-described embodiments, and various modifications are possible without departing from the essence and gist of the present invention.

For example, the battery pack 10 of the embodiment above includes the connected body 18 in which the two battery core packs 16a, 16b are connected to each other. However, the battery pack 10 may include one battery core pack, or may include a connected body (not shown) in which three or more battery core packs are connected together.

With the battery pack 10 of the embodiment above, the lower-side battery core pack frame 32 includes the flange portion 34, the abutting portion 36, and the connecting portion 38. However, the structure is not particularly limited to this example. The lower-side battery core pack frame 32 may be configured in any other manner as long as it can support the connected body 18 (battery core packs 16) inside the exterior case 12. Also, the structure for fixing the lower-side battery core pack frame 32 to the exterior case 12 is not limited to the lower-side fixing groove 30, but can take various configurations, like the use of bolts and nuts, for example. The same applies to the upper-side battery core pack frame 46 and the upper-side fixing groove 44.

What is claim is:

1. A battery pack including a battery core pack having a plurality of battery cells held in a cell holder, and a case accommodating the battery core pack, wherein the case includes an exterior case configured to cover side surfaces of the battery core pack and a bottom case configured to cover a bottom surface of the battery core pack, a lower end of a battery core pack frame configured to support the battery core pack is provided with a flange portion that projects in a horizontal direction, a fixing portion configured to support the battery core pack frame by abutting on a lower end surface of the flange portion is provided at an inner wall of a side of the exterior case, the fixing portion supports the battery core pack frame, whereby the battery core pack frame is fixed with respect to the inner wall of the side of the exterior case, and the fixing portion is disposed at a position above an upper end portion of the bottom case that is attached to a lower end portion of the exterior case; wherein the battery core pack frame includes an abutting portion on which a lower end surface of the battery core pack abuts, the flange portion that is disposed at a position below the abutting portion, and a connecting portion that connects the abutting portion and the flange portion, the connecting portion is inclined in a direction from the flange portion's side to the abutting portion's side such that a distance from an inner surface of the exterior case becomes larger.

2. The battery pack according to claim 1, wherein the fixing portion comprises a fixing groove formed in an inner surface of the exterior case; and the battery core pack frame comprises the flange portion configured to be inserted into the fixing groove.

3. The battery pack according to claim 2, wherein each corner of the battery core pack frame and the exterior case is rounded, with a radius of curvature of corners of the battery core pack frame being larger than a radius of curvature of corners of the exterior case.

4. The battery pack according to claim 1, wherein the case includes a top case configured to cover an upper surface of the battery core pack, and the fixing portion is disposed at a position below a lower end portion of the top case that is attached to an upper end portion of the exterior case.

5. The battery pack according to claim 1, wherein the fixing portion is groove-shaped where the inner wall of the side of the exterior case has been dented in the horizontal direction, the flange portion is inserted into the fixing portion and is held by the fixing portion from above and below, whereby the battery core pack frame is fixed with respect to an inner-side surface of the exterior case.

* * * * *